United States Patent
Bruchner

(10) Patent No.: US 9,660,692 B2
(45) Date of Patent: May 23, 2017

(54) APPARATUS AND METHOD TO PERFORM A DOUBLE CORRELATION

(71) Applicant: Cascoda Limited, Bath (GB)

(72) Inventor: Wolfgang Bruchner, Southampton (GB)

(73) Assignee: Cascoda Limited, Bath (GB)

( * ) Notice: Subject to any disclaimer, the term of this patent is extended or adjusted under 35 U.S.C. 154(b) by 0 days.

(21) Appl. No.: 14/769,857

(22) PCT Filed: Feb. 21, 2014

(86) PCT No.: PCT/GB2014/050512
§ 371 (c)(1),
(2) Date: Aug. 24, 2015

(87) PCT Pub. No.: WO2014/128479
PCT Pub. Date: Aug. 28, 2014

(65) Prior Publication Data
US 2016/0006478 A1   Jan. 7, 2016

Related U.S. Application Data

(60) Provisional application No. 61/768,010, filed on Feb. 22, 2013.

(30) Foreign Application Priority Data

Feb. 22, 2013 (GB) .................................. 1303154.7

(51) Int. Cl.
*H04B 1/709* (2011.01)
*H04J 3/06* (2006.01)

(52) U.S. Cl.
CPC ............ *H04B 1/709* (2013.01); *H04J 3/0611* (2013.01)

(58) Field of Classification Search
CPC ................................. H04B 1/40; H04B 1/709
See application file for complete search history.

(56) References Cited

U.S. PATENT DOCUMENTS

| | | | |
|---|---|---|---|
| 5,903,595 A | 5/1999 | Suzuki | |
| 8,849,226 B2 * | 9/2014 | Bruchner | H04B 1/40 370/252 |
| 2002/0048316 A1 * | 4/2002 | Imaizumi | H04B 1/7093 375/150 |

FOREIGN PATENT DOCUMENTS

| | | |
|---|---|---|
| EP | 1 128 564 A1 | 8/2001 |
| EP | 2 467 984 A2 | 6/2012 |
| GB | 2472774 A | 2/2011 |

OTHER PUBLICATIONS

International Search Report and Written Opinion for corresponding International Patent Application No. PCT/GB2014/050512 dated Jun. 11, 2014.

(Continued)

*Primary Examiner* — Jaison Joseph
(74) *Attorney, Agent, or Firm* — Renner, Otto, Boisselle & Sklar, LLP

(57) ABSTRACT

An apparatus is described for performing a correlation function on a received signal and a plurality of predetermined chip codes from a communication standard. The apparatus comprising: a first plurality of logic gates configured as a multiplier unit operable to receive a signal sampled at a predetermined sampling frequency, and to perform predetermined multiplication operations on the input signal in accordance with the correlation function; a first memory unit operable to receive and store multiplication values from the first plurality of logic gates; a second memory unit having stored therein values from predetermined multiplication operations performed on the plurality of chip codes in accordance with the correlation function; and a second (Continued)

plurality of logic gates configured as an adder unit to receive multiplication values outputted from the first memory unit and the second memory unit and to sum the multiplication values from the first memory unit taking into account the multiplication values in the from the second memory unit.

14 Claims, 10 Drawing Sheets

(56) References Cited

OTHER PUBLICATIONS

Combined Search and Examination Report for corresponding United Kingdom Patent Application No. 1303154.7 dated Aug. 22, 2013.

* cited by examiner

APPARATUS AND METHOD TO PERFORM A DOUBLE CORRELATION

This application is a national phase of International Application No. PCT/GB2014/050512 filed Feb. 21, 2014 and published in the English language, which claims priority to United Kingdom Application No. 1303154.7 and U.S. Provisional Application No. 61/768,010 both filed Feb. 22, 2013, which are all hereby incorporated herein by reference in their entirety.

INTRODUCTION

The present invention relates generally to a method and apparatus for signal processing, and in particular for implementing a correlation function decoding process.

The applicants have previously described a wireless transceiver in GB2472774B. The wireless transceiver described in GB2472774B implements a double-correlation algorithm for symbol detection in a baseband demodulation/detection circuit as part of a direct sequence spread spectrum (DSSS) receiver system. The example described in GB2472774B uses the IEEE802.15.4 standard in which 16 possible symbols are coded (i.e., spread) with a chip code of 32 chips (or bits) per symbol.

FIG. 1 of the accompanying figures illustrates schematically a representation of the double-correlation described in GB2472774B. The correlation function illustrated in the figure is performed on a baseband signal and the same baseband signal with a lag-delay with a depth of up to 3. The correlation function also uses a look-up-table (LUT) having stored therein the chip codes according to the selected standard. The output from the correlation function is a correlation value for each of the chip codes indicating the likelihood that the received symbol corresponds to each chip code. For more details of how the correlation function is performed see GB2472774B.

The double-correlation algorithm may be represented as shown below:

$$c(s) = \left| \sum_{d=1}^{3} \sum_{n=d}^{31} y_n^* * y_{n-d} * s_{s,n} * s_{s,n-d}^* \right|$$

With (complex multiplication):

$$\Re_{(x(n-d)^*x^*(n))} = \Re_{x(n-d)} * \Re_{x(n)} + \Im_{x(n)}$$

$$\Im_{(x(n-d)^*x^*(n))} = \Im_{x(n-d)^*}$$
$$\Re_{x(n)} + q_j \Re_{x(n-d)^*} \Im_{x(n)}$$

Received baseband signal $y_n$: $y_n = I_{BBn} + jQ_{BBn}$

Pseudo-random noise (PN) direct sequence spread-spectrum chip code of symbol s:

$$s_s = SI_s + jSQ_s$$

Parameters: Number of symbols: s=0-15
Number of chips per symbol: n=0-31
Lag delay of chips (or bits): d=1-3

As described in GB2472774B, a received signal is processed by an analogue circuit before being fed to an analog-to-digital converter (ADC) typically operating at 4 bits. The digital signal from the ADC is subsequently fed to a sampler operating with an over-sampling factor (or NOS) of 8, but other integer values may be used from 2 to 16.

The correlation function illustrated in FIG. 1 includes non-trivial multiplications for incoming baseband signal $y_n$, trivial multiplications for stored chip codes $s_s$, and arithmetic processing $(y^*_n * y_{n-d}) * (S_n * s_{n-d})$ or outer product processing, as described further below.

Non-trivial multiplications for the incoming baseband signal $y_n$:

Operations for $(y^*_n * y_{n-d})$:

$$IQ_{BB}(d,n) = I_{BB}(n-d) * I_{BB}(n) + Q_{BB}(n-d) * Q_{BB}(n)$$

$$QI_{BB}(d,n) = Q_{BB}(n-d) * I_{BB}(n) - I_{BB}(n-d) * Q_{BB}(n)$$

$$I_{BB}(n-d) * I_{BB}(n) \ d=1 \ldots 3$$

$$Q_{BB}(n-d) * Q_{BB}(n) \ n=d \ldots 31$$

$$I_{BB}(n-d) * Q_{BB}(n)$$

$$Q_{BB}(n-d) * I_{BB}(n)$$

For the non-trivial multiplications illustrated above for the incoming signal, 4*(31+30+29)=360 multiplications are required for a 4-bit ADC converted baseband signal and 180 summations.

Trivial multiplications for stored chip codes $s_s$:
Operations for $(s_n * s^*_{n-d})$:

$$SqI(s,d,n) = SI(s,n-d) * SI(s,n) + SQ(s,n-d) * SQ(n)$$

$$SqQ(s,d,n) = SQ(s,n-d) * SI(s,n) - SI(s,n-d) * SQ(n)$$

$$SI(s,i), SQ(s,i) = (0,1)$$

For the trivial multiplications illustrated above 5760 1-bit multiplications (logic AND) and 2880 summations are required.

For the further arithmetic processing of $(y^*_n * y_{n-d}) * (s_n * s^*_{n-d})$ or the outer product 5760 multiplications and 4320 summations are required.

In summary, the correlation function when performed on 16 codes (s), each having a 32 chip (n) code word using a lag-delay of depth 3 (d), including a complex input signal (i.e., $I_{BB}$, $Q_{BB}$) with a 4-bit resolution, results in a 3-dimensional problem of (n*d*s). If the transceiver described in GB2472774B, including logic gates to perform the double-correlation function, is implemented in an application-specific integrated circuit, or ASIC, it will be appreciated that direct implementation of the double-correlation function or algorithm would be complex and expensive in terms of area (i.e., silicon area), cost (i.e., fabrication and yield) and power consumption for a low-power, and preferably low-cost, receiver.

Accordingly, there is a desire to reduce the complexity of the hardware (e.g., in terms of the number of logic gates) used to perform the correlation function such that silicon area and power consumption may also be reduced.

SUMMARY OF THE INVENTION

According to a first aspect of the invention there is provided an apparatus for performing a correlation function on a received signal and a plurality of predetermined chip codes from a communication standard, the apparatus comprising: a first plurality of logic gates configured as a multiplier unit operable to receive a signal sampled at a predetermined sampling frequency, and to perform predetermined multiplication operations on the input signal in accordance with the correlation function; a first memory unit operable to receive and store multiplication values from the first plurality of logic gates; a second memory unit having stored therein values from predetermined multiplication operations performed on the plurality of chip codes in accordance with the correlation function; and a second plurality of logic gates configured as an adder unit to receive multiplication values outputted from the first memory unit and the second memory unit and to sum the multiplication values from the first memory unit taking into account the multiplication values from the second memory unit.

In accordance with some embodiments the apparatus further comprises a third plurality of logic gates configured as a result-adder unit operable to receive and sum values received from the second plurality of logic gates.

In accordance with some embodiments the apparatus further comprises a sequencer operable to select multiplication values associated with one of the chip codes stored in the second memory unit to be outputted to the second plurality of logic gates, whereby the second plurality of logic gates is operable to sum the multiplication values from the first memory unit taking into account the multiplication values for the selected chip code.

In accordance with some embodiments the apparatus further comprises a correlation value memory unit operable to receive and store the sum of the values from the third plurality of logic gates for the selected chip code, wherein the correlation value memory unit is configured to receive a selection signal from the sequencer to select a position in the correlation value memory unit to store the sum of the values from the third plurality of logic gates.

In accordance with some embodiments the apparatus further comprises a sign selection unit configured to assign a positive or negative sign to each value from the first plurality of logic gates dependent on the sign of an associated value stored in the second memory unit.

In accordance with some embodiments the apparatus further comprises an input sample memory configured to store therein the received sampled signal and to output sampled signal values to the first plurality of logic gates.

In accordance with some embodiments the first plurality of logic gates is configured to perform a predetermined number of product calculations in parallel based on the number of chips in the chip code and wherein the input sample memory is configured to output a predetermined number of samples to the first plurality of logic gates based on the correlation function and the number of chips in the chip code.

In accordance with some embodiments the first plurality of logic gates is configured to perform a predetermined product calculation and output the result to the first memory unit, wherein the input sample memory is configured to output samples to the first plurality of logic gates based on the correlation function.

In accordance with some embodiments the first memory unit comprises a plurality of cells arranged in series, wherein each cell comprises an output for outputting a multiplication value, whereby the multiplication values from the plurality of cells are stored in series from the first plurality of logic gates and output in parallel.

In accordance with some embodiments the number of cells and cell outputs is based on the number of chips in the chip code.

In accordance with some embodiments each of the cells comprises a plurality of shift registers arranged in series.

In accordance with some embodiments one of the cells is arranged to hold a value for a predetermined period of time dependent on a hold signal received from the sequencer while values are fed through the one cell.

In accordance with some embodiments the second plurality of logic gates is operable to sum the multiplication values from the first memory unit when a predetermined number of multiplication values based on the number of chip codes are stored therein.

In accordance with some embodiments the correlation function is a double-correlation function.

According to a second aspect of the invention there is provided a receiver comprising: an analog signal input for receiving an analog signal; an analog-to-digital converter arranged to convert the received analog signal into a digital signal; and a demodulator connected to the output of the an analog-to-digital converter; the demodulator comprising a sampler operable to sample the digital signal at a predetermined sampling frequency; and an apparatus according to the first aspect of the invention.

According to a third aspect of the invention there is provided a method for performing a correlation function on a received signal and a plurality of predetermined chip codes from a communication standard, the method comprising the steps of: receiving a signal sampled at a predetermined sampling frequency; performing predetermined multiplication operations on the input signal in accordance with the correlation function; storing multiplication values from the predetermined multiplication operations performed on the input signal in a first memory unit; configuring a second memory unit having stored therein values from predetermined multiplication operations performed on the plurality of chip codes in accordance with the correlation function; and summing the multiplication values from the first memory unit taking into account the multiplication values stored in the second memory unit.

BRIEF DESCRIPTION OF THE DRAWINGS

For a better understanding of the invention and to show how the same may be carried into effect reference is now made by way of example to the accompanying drawings in which.

Figure 1:
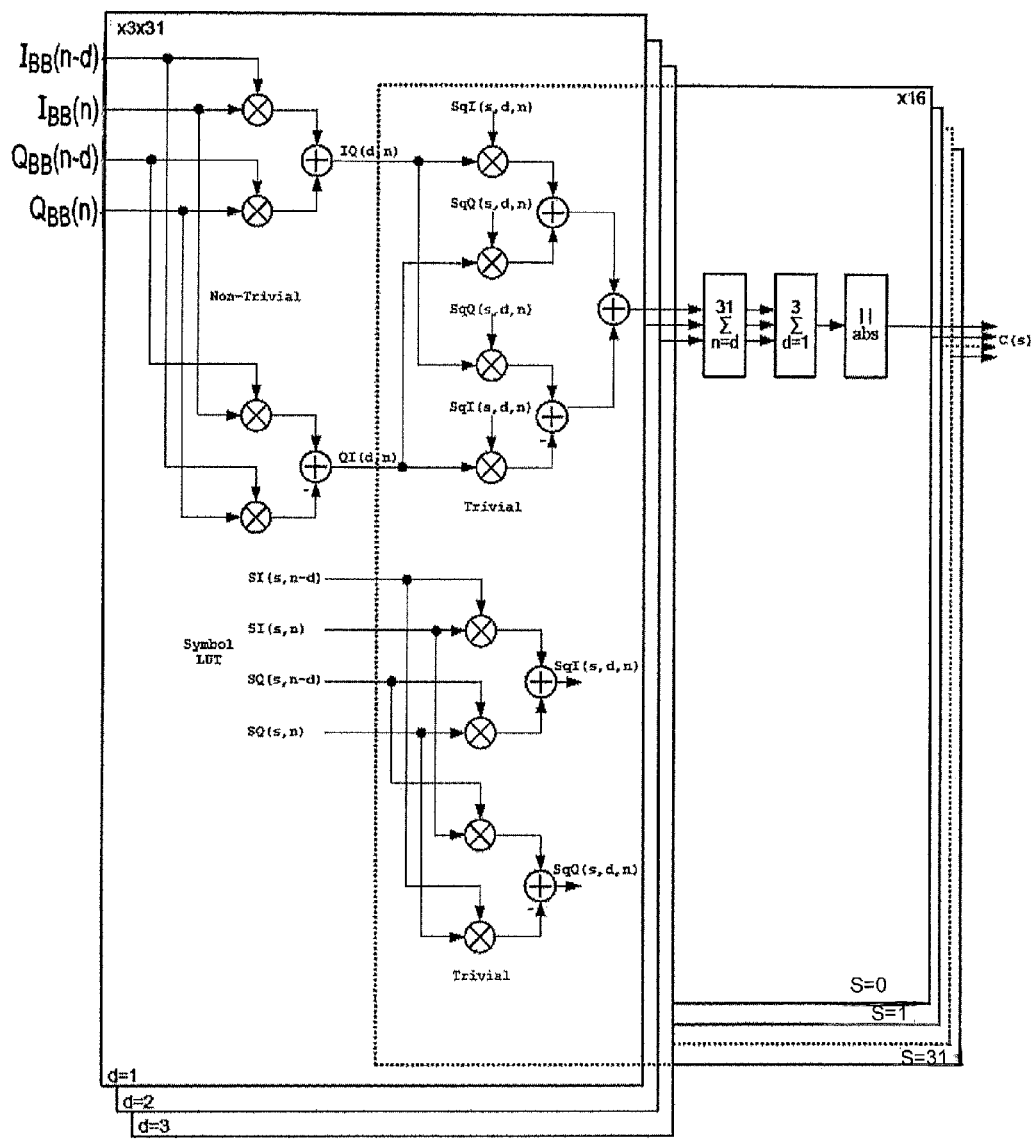
FIG. 1 of the accompanying figures illustrates schematically a representation of a known double-correlation function.

While the invention is susceptible to various modifications and alternative forms, specific embodiments are shown by way of example in the drawings and are herein described in detail. It should be understood however that drawings and detailed description attached hereto are not intended to limit the invention to the particular form disclosed but rather the invention is to cover all modifications, equivalents and alternatives falling within the scope of the claimed invention.

DETAILED DESCRIPTION

Figure 2:
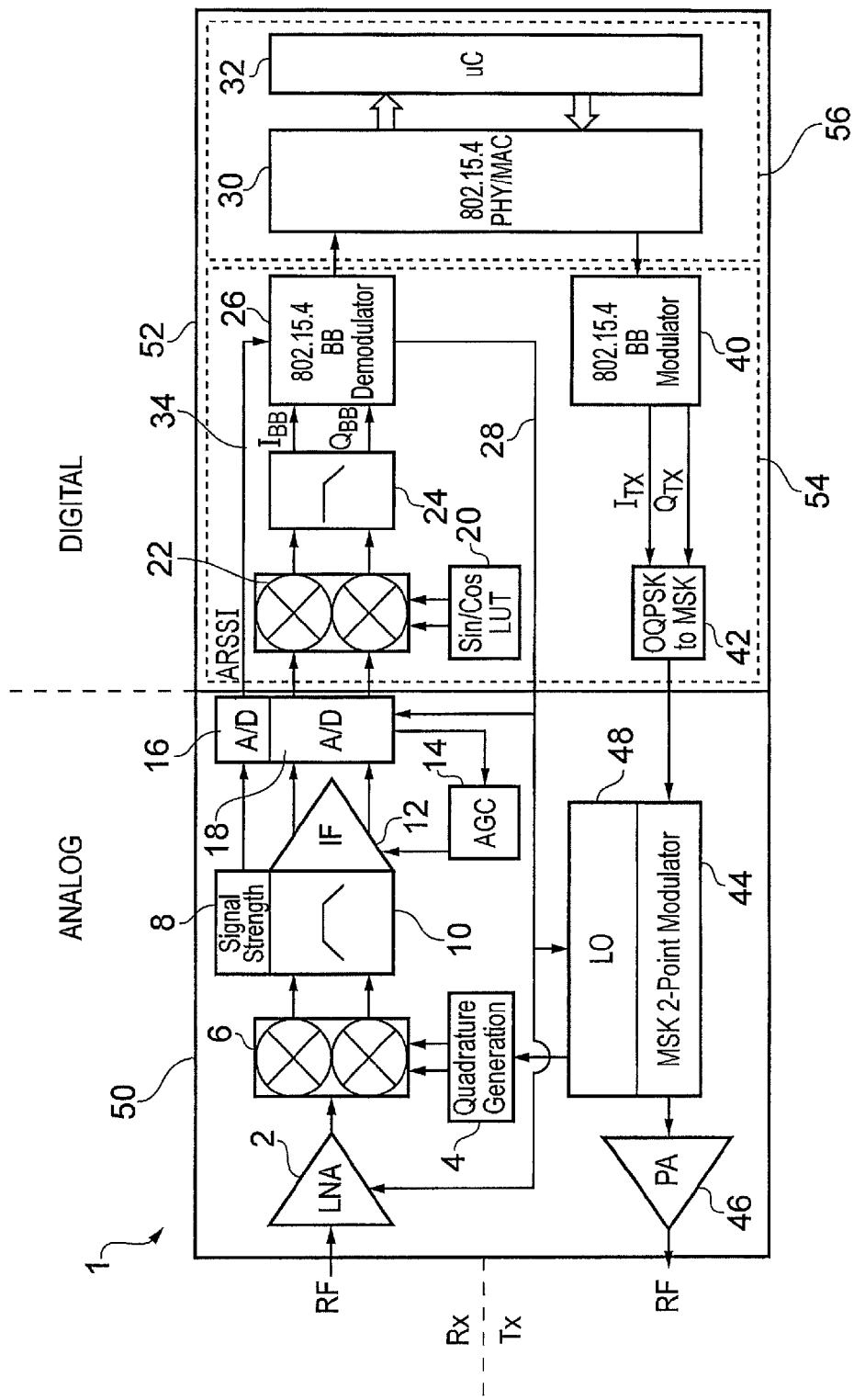
FIG. 2 illustrates schematically a transceiver according to a first embodiment of the invention.

FIG. 2 illustrates schematically a transceiver 1 according to a first embodiment of the invention. The transceiver 1 shown in the figure is an integrated system. The external components include an antenna, an oscillator crystal and a power supply decoupler. That is to say the transceiver may be implemented on one chip, i.e. in a single integrated circuit. However, it will be appreciated that although desirable for cost reasons, a single chip solution is not a technical necessity.

The transceiver 1 has a functional split into two parts, namely a receiver Rx and a transmitter Tx, as well as a hardware split into two parts, namely an analog unit 50 and a digital unit 52. The analog unit 50 provides a radio frequency (RF) front end for the transmitter and receiver. The digital unit 52 comprises a digital baseband (BB) processor 54 and a system control unit 56. Referring to FIG. 2, the receiver components 2, 6, 10, 12, 18, 22, 24, and 26 are arranged in the upper part of the drawing with the signal path from left to right, and the transmitter components 40, 42, 44 and 46 are arranged in the lower part of the drawing with the signal path from right to left. Both the receiver and transmitter components interact with the higher level control and processing components 30 and 32 visible in the right hand part of the drawing in the control unit 56. The analog RF front end 50 forms the left hand block of the drawing and the digital components in the digital unit 52 form the right hand block of the drawing. As will be appreciated the receiver signal is initially processed with analog components and subsequently processed with digital components, whereas the transmitter signal is initially formed digitally before being processed with analog components.

First the receiver is described. The receiver Rx comprises a low noise amplifier 2 (LNA) at the input connected to an antenna (not shown). The LNA is a high-gain amplifier with a target noise figure of ≤3 dB. The SNR or the sensitivity of the LNA 2 is controllable. The signal received by the LNA 2 is at a frequency of 2.405 GHz, as specified by the IEEE 802.15.4 standard. It is noted that in the IEEE 802.15.4 standard there are 16 possible channels and 2.405 GHz is one of the channels. The output of the LNA 2 is electrically connected to a down conversion mixer 6 or a passive quadrature mixer. The down conversion mixer 6 combines the amplified signal with quadrature signals I and Q generated by a quadrature generation unit 4. The quadrature generation unit 4 provides quadrature signals I and Q, where Q is 90 degrees out of phase with I. The quadrature generation unit 4 is driven by a local oscillator 48 (LO), which produces a sine wave output at a frequency of 2.405 GHz±2 MHz (2.405 GHz+2 MHz or 2.405 GHz−2 MHz), i.e. RF. The LO 48 may be a frequency synthesiser based on fractional-N phase locked loop (PLL) using a 3rd-order signal-delta (ΣΔ) modulator. However, it will be appreciated that other oscillators might be used. The LO 48 is also used by the transmitter Tx. The down conversion mixer 6 has two outputs, namely the in-phase component and the out-of-phase component.

The down conversion mixer 6 is connected to a bandpass filter 10 and an IF amplifier 12. The bandpass filter is used to remove the RF component from each of the two signals from the down conversion mixer 6. The signal strength of the IF signals that are fed into the bandpass filter 6 from the IF amplifier 12 are detected by a signal strength detection unit 8. The $I_{IF}$ and $Q_{IF}$ signal components and the signal strength output are fed into respective analog to digital converters 18, 16 (ADC). The $I_{IF}$ and $Q_{IF}$ signal components are fed into a dual input ADC and the signal strength output signal from the signal strength unit 8 is fed into a separate ADC. The resolution and the sampling frequency of the dual input ADC are controllable.

The dual-input ADC 18 and the IF amplifier 12 comprises an automatic gain control loop (AGC) comprising an AGC unit 14. The AGC unit 14 is fed by the digital output from the dual-input ADC 18. The AGC unit 14 determines whether or not the gain of the IF amplifier 12 is high or low enough for the input signal. If the signal is not high enough the gain of the IF amplifier 12 is increased and if the signal is too high the gain of the IF amplifier 12 is decreased. To determine whether or not the signal is too high or too low, the digital output is analysed. For example, if the bits from the most significant bits of the digital output signal have a consistently 'low' or 'zero' value, it is determined that the gain of the IF amplifier 12 should be increased. That is to say, if the fifth bit to the eight bit of an 8 bit ADC have a consistently 'low' or 'zero' value, it is determined that the gain of the IF amplifier 12 should be increased.

A connection 34 is made from the ADC 16 (for the signal strength detection unit 8) to a demodulator 26. The connection 34 between the ADC 16 and the demodulator 26 is referred to as the analog received signal strength indication (ARSSI).

The digital outputs for the $I_{IF}$ and $Q_{IF}$ signal components are fed into a digital intermediate frequency-to-baseband (IF-to-BB) down conversion mixer 22. The down conversion mixer 22 is also fed by a Sin/Cos look-up table (LUT) 20. The Sin/Cos LUT 20 provides a digitised version of a sine wave and digitised version of a 90 degree out-of-phase signal, namely a cosine wave. The Sin/Cos LUT 20 outputs the digitised sine and cosine waves, which have a frequency of 2 MHz, but are processed at a sampling rate of 4-16 MHz. For the purposes of the following it is assumed that a sampling rate of 16 MHz is used. The digitised sine and cosine signals from the Sin/Cos LUT 20 are multiplied with the $I_{IF}$ and $Q_{IF}$ signal components in the down conversion mixer 22.

The in-phase and out-of-phase components output from the down conversion mixer 22 are then fed into a low pass filter 24, before being fed into the demodulator 26. The low pass filter 24 removes the IF frequency component from the in-phase and out-of-phase signals fed from the down conversion mixer 22, such that the BB component of each of the in-phase and out-of-phase signals ($I_{BB}$ and $Q_{BB}$) is output. The BB signals $I_{BB}$ and $Q_{BB}$ having a bandwidth of 2 MHz and a chip frequency of 2 MHZ, as specified by the IEEE 802.15.4 standard. The chip frequency or chip rate is used to describe the frequency or rate of the chips in the received signal.

The demodulator 26 is a semi-coherent baseband demodulator. The operation of the semi-coherent baseband demodulator is based on maximum detection of the correlator output, more particularly maximum likelihood (ML) time-delayed double-correlation and continuous frequency correction during packet reception.

The demodulated output is in the form of the transmitted packet of bytes of data, as specified by the IEEE 802.15.4 standard, which is fed to an integrated 802.15.4 upper physical layer (PHY) and media access control (MAC) layer unit 30. This is connected to a multipurpose microcontroller 32. The microcontroller 32 may also be connected to at least one input device (e.g. temperature sensor) and/or at least one controllable device (e.g. heater).

The demodulator 26 also comprises a number of output connections 28, which are used to control the LNA 2, the LO 48, and the ADC 18.

The transmitter Tx is now described. The transmitter comprises a modulator 40 that is connected to the 802.15.4 PHY/MAC unit 30. The 802.15.4 PHY/MAC unit 30 outputs a packet of data to be transmitted in the form of a number of bytes as specified by the IEEE 802.15.4 standard. The modulator 40 is a standard modulator, as is known in the art to produce both the in-phase and out-of-phase components ($I_{Tx}$ and $Q_{Tx}$) of the symbols to be transmitted. The symbols to be transmitted are modulated such that the in-phase component $I_{Tx}$ comprises the even bits and the out-of-phase component $Q_{Tx}$ comprises the odd bits of the 32 chip symbols. The in-phase and out-of-phase components are then shaped using half-sine pulse shaping. The in-phase and out-of-phase components shaped with half-sine pulse shaping are then output to an OQPSK-to-MSK converter 42.

The modulated $I_{Tx}$ and $Q_{Tx}$ signals are then combined to a minimum shift keying (MSK) format in the OQPSK-to-MSK converter 42. The digital output from the OQPSK-to-MSK converter 42 is fed to a MSK 2-point modulator 44, as is known in the art, i.e. a dual-point MSK modulation architecture. Frequency synthesis is provided by the LO 48. The MSK 2-point modulator 44 modulates the LO 48 signal based on the digital output from the OQPSK-to-MSK converter 42.

The modulated signal from the MSK 2-point modulator 44 is fed to a power amplifier (PA) 46, which has programmable output power. PA 46 is connected to an antenna (not shown) for transmission of the signal.

Figure 3:
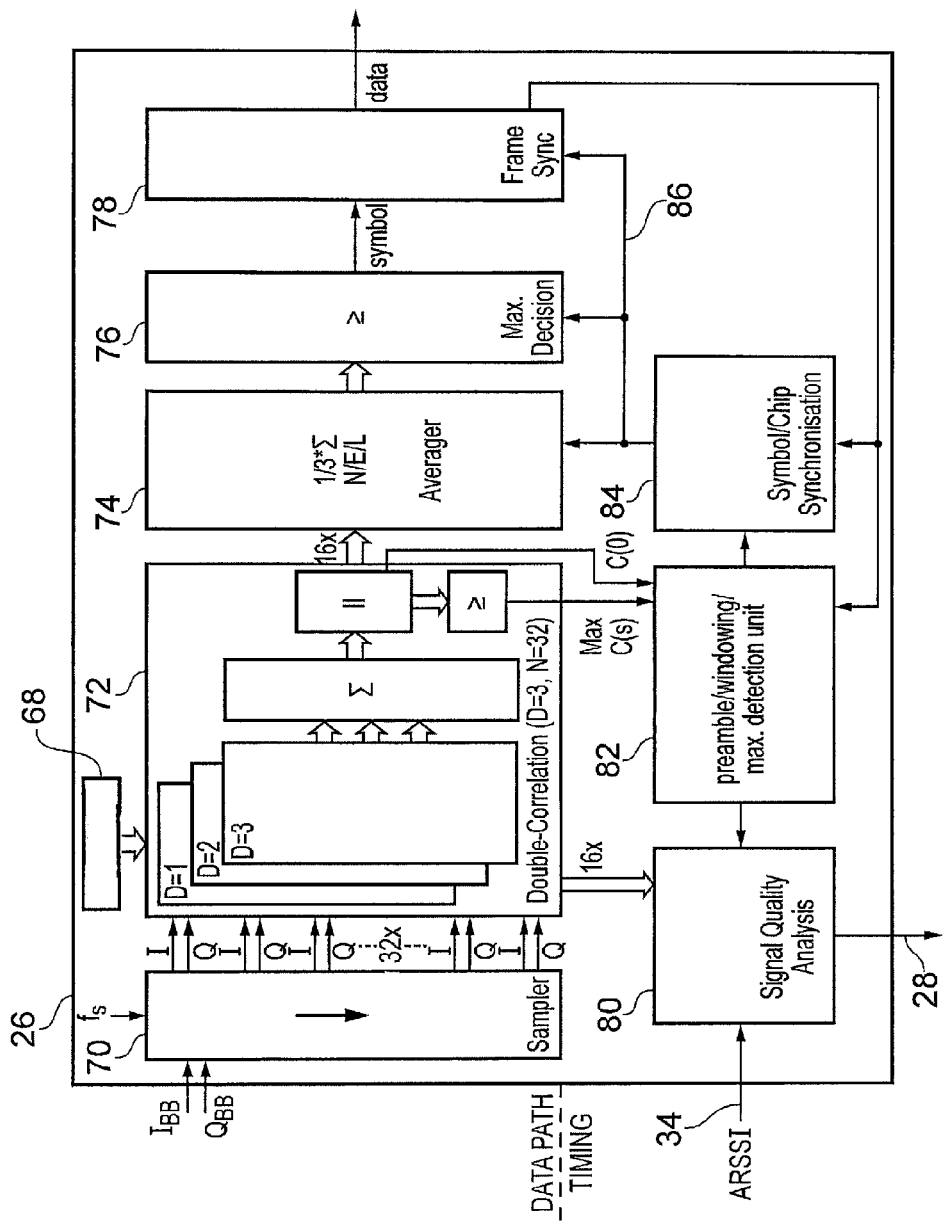
FIG. 3 shows a schematic illustration of a demodulator shown in FIG. 2.

FIG. 3 shows a schematic illustration of the demodulator 26 shown in FIG. 2.

The demodulator 26 is divided into an upper data path portion and a lower timing portion. The upper data path portion comprises a sampler 70, a double-correlator 72, an averaging unit 74, a maximum decision unit 76 and a frame synchronisation unit 78. The upper data path has a data path running from left to right. The lower timing portion comprises a preamble/windowing/maximum detection unit 82 and a symbol/chip synchronisation unit 84. The demodulator 26 also comprises a signal quality analysis unit 80, which provides the control for the LNA 2, the ADC 18 and the LO 48, shown in FIG. 2.

The in-phase and out-of-phase signal components $I_{BB}$ and $Q_{BB}$ from the low pass filter 24 shown in FIG. 2 are fed into the sampler 70. The sampler 70 has a further input $f_s$ for the sampling signal. The sampling frequency is set to be 2, 4 or 8 times the transceiver's chip frequency ($f_{chip}$) or chip rate to provide oversampling at a ratio of 2, 4 or 8 respectively, the oversampling ratio being referred to as NOS. The oversampling ratio is defined as $f_s/f_{chip}$ (n.b. $f_s/c_{chip}=2$ MHz according to IEEE 802.15.4). For this example it is assumed that the sampling frequency $f_s$ is 16 MHz or 8 times the chip frequency of 2 MHz. The sampler 70 samples 32 chips (i.e. 32 chips for one symbol) of the incoming signal in the form of 16 chips from the in-phase component and 16 chips from the out-of-phase component. The 32 chips sampled by the sampler 70 are then fed into a double-correlator 72 or correlation unit. The chip frequency is set at 2 MHz, but the sampling is carried out at 16 MHz with an oversampling ratio of 8. Therefore, it will be appreciated that the received signal is sampled 32 times the oversampling ratio to effectively sample a 32 chip symbol. In other words, for a 32 chip symbol 256 points or bit are sampled. Thus, for each chip of the 32 chip symbol there are 8 sampled points when using an oversampling ratio of 8. This process is repeated over time by repeatedly sampling the incoming signal. It will be appreciated that the receiver 1 is constantly sampling and demodulating the received signal, since many symbols are transmitted, which will form a packet because the IEEE 802.15.4 standard is packet based. It will be further appreciated that 256 samples are the minimum used when using a chip code with 32 chips and an over sample of 8, but further samples may be used as described below.

The double-correlator 72 has 16 outputs for C(15:0), namely the correlation values between the sampled signal (i.e. the sampled received signal) and the 16 known 32 chip symbols or chip codes, as specified in the IEEE 802.15.4 standard. Predetermined values based on the 32 chip symbols are provided to the double-correlator 72 from a look-up-table or LUT 68. The correlator 72 also outputs the maximum of the correlator outputs Max C(s). The maximum correlator output value Max C(s) is taken to be the maximum correlator output of each of the 16 outputs at a given sampling point. It will be appreciated that the sum could also be used to represent the maximum correlator output Max C(s). The maximum correlator output is fed to the preamble/windowing/maximum detection unit 82 in the timing portion of the demodulator 26.

The correlator outputs C(15:0) are fed to an averaging unit 74. The averaging unit 74 calculates an average of a now, an early and a late point of each of the correlator outputs. The now, early and late points are defined in more detail in GB2472774B. The averaged correlator outputs C(15:0) values are then fed to the maximum decision unit 76. It will be appreciated that the averaging unit 74 may be omitted and the correlator outputs C(15:0) fed from the double-correlator 72 to the maximum decision unit 76 or symbol selection unit.

The maximum decision unit 76 selects the correlator output having the maximum value, based on a comparison between each of the correlator values also known as a maximum likelihood test. The correlator output having the maximum value is deemed to be the transmitted symbol. The maximum decision unit 76 then outputs the symbol having the maximum correlator output to the frame synchronisation unit 78. The frame synchronisation unit 78 synchronises the transmitted frame or packet to be output from the demodulator 26. That is to say the frame synchronisation unit 78 synchronises the received symbols, such that the data are output in the correct packet form. As is shown in the figure each of the averaging unit 74, the maximum decision unit 76 and the frame synchronisation unit 78 are also fed by the symbol/chip synchronisation unit 84. The symbol/chip synchronisation unit 84 provides the timing information for each of these elements via a timing connection 86. The timing connection 86 provides the synchronisation within the demodulator 26, such that the chips/symbols are detected at the correct point in time.

The timing portion is now discussed.

The preamble detector 82 is used to identify the preamble section of the received data packet. In the IEEE 802.15.4 standard, the preamble comprises 8 repeats of the zero symbol S(0).

The preamble detector 82 receives the Max C(s) signal and the correlator output for the zero symbol S(0), namely C(0). During the preamble part of the received packet, it is known that only zero symbols are transmitted; therefore, this is used to establish the frequency and phase of the transceiver to correspond with the received data in the symbol/chip synchronisation unit 84. The output from the preamble detection unit 82 is fed to the symbol/chip synchronisation unit 84, also referred to as a frequency correction unit. The symbol/chip synchronisation unit 84 provides the synchronisation timing in the form of a chip-clock. The term chip-clock is used to describe a clock that is operating at the chip frequency, i.e. 2 MHz. The symbol/chip synchronisation unit 84 may also provide a symbol clock, which is a multiple of the chip-clock, i.e. 1/32 times the chip-clock e.g. 62.5 KHz. The chip-clock is provided by the symbol/chip synchronisation unit 84 via the timing connection 86. The chip-clock can be corrected/adjusted by the symbol/chip synchronisation unit 84 by altering the NOS momentarily, since the sampling frequency is fixed. The correction/adjustment is carried out to ensure that the receiver LO is synchronised with the received signal. The symbol/chip synchronisation unit 84 also ensures that the averaging unit 74, the maximum decision unit 76 and the frame synchronisation unit 78 are operating at the correct synchronisation point with the received data via timing connection 86, since these elements of the demodulator are working at the chip/symbol level.

The demodulator 26 also contains a signal quality analysis unit 80. The output connection 34 of the signal quality analysis unit 80 is fed back to the analog front end of the receiver. The signal quality analysis is based on the analog received signal strength indication (ARSSI) from connection 34 (this being the digitised output from the signal strength unit 8), the double-correlator 72 and the preamble detection unit 82. The signal quality analysis unit 80 provides a control output on line 28. The control output from the signal quality analysis unit 80 is supplied as an input to components in the analog block 50, in particular to the LNA 2, where it is used as a control parameter to adjust the SNR or the sensitivity when the input signal quality to the demodulator 26 is judged to exceed the requirements of the standard (or some more stringent requirement threshold). A dynamic reduction in receiver power consumption can thereby be effected by reducing SNR or the sensitivity in one or more of the RF front end amplification components. It will be appreciated that as a result of by reducing SNR or the sensitivity, the gain might also be reduced. The control output 28 is also fed to the ADC 18 where it is used as a control parameter to adjust the number of bits of resolution of the ADC and/or the sampling frequency of the ADC in the sense that, when the input signal quality to the demodulator 26 is judged to exceed the requirements of the standard (or some more stringent requirement threshold), the number of bits can be reduced and/or the sampling frequency can be reduced, thereby reducing receiver sensitivity to reduce power consumption. The control output 28 is further input to the LO 48 where it is used as a control parameter to adjust the bias current of the LO 48, thereby reducing the power consumed by the LO 48, while increasing the phase noise within practical limits. It will be appreciated that any permutation of these possible control loops may be envisaged so that, for example, feedback control from the demodulator 26 may only be exercised on one or two of the LNA 2, LO 48 and ADC 18.

Further details of the transceiver operation can be found in GB2472774B.

Figure 4:
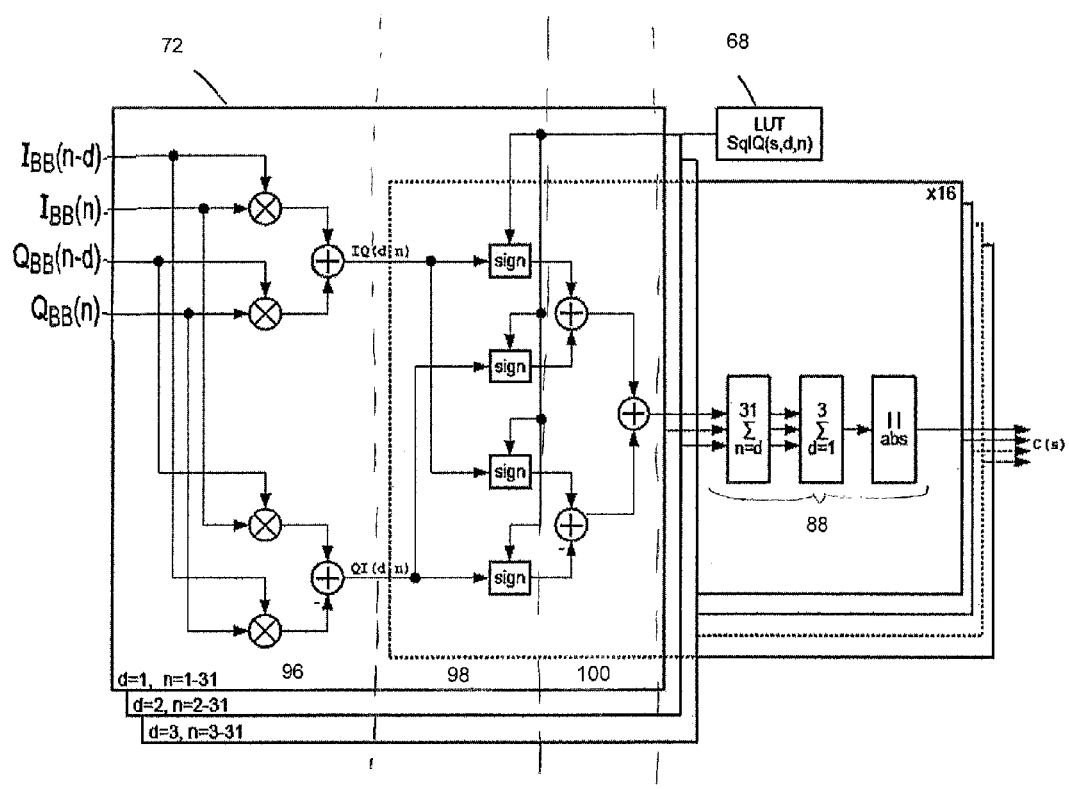
FIG. 4 illustrates a representation of a double-correlator shown in FIG. 3.

FIG. 4 illustrates a representation of the double-correlator 72, shown in FIG. 3, in accordance with the first embodiment of the invention. By comparing the correlation function illustrated in FIG. 1 with the function illustrated in FIG. 4 it can be seen that the operations related to the trivial multiplications of the stored chip codes are no longer present in FIG. 4 in accordance with the first embodiment of the invention. This is because in the first embodiment of the invention, the trivial multiplications involving the chip codes are performed and stored in the look-up-table 68 in advance of receiving any signals. It is noted that the correlation function that is performed according to embodiments of the invention is the same as that described in the introduction section. For completeness the function that is performed according to embodiments of the invention is as follows:

$$c(s) = \left| \sum_{d=1}^{3} \sum_{n=d}^{31} y_n^* * y_{n-d} * s_{s,n} * s_{s,n-d}^* \right|$$

Parameters:
Number of symbols: s=0-15
Number of chips per symbol: n=0-31
Lag delay of chips (or bits): d=1-b 3

It is noted that the correlation is performed over n=d to 31, since it is non-causal (i.e., chips from a previous symbol would be included when determining the correlation value for the current symbol) to perform the correlation on n=0 to 31 with a lag-delay 1 to 3, is this would result in attempting to determine the correlation for n being negative. It is further noted that the lag delay refers to the previously received values.

The operations involving the chip codes, $(s_n * s^*_{n-d})$, only are as follows:

$SqI(s,d,n) = SI(s,n-d)*SI(s,n) + SQ(s,n-d)*SQ(s,n)$ $SqQ(s,d,n) = SQ(s,n-d)*SI(s,n) - SI(s,n-d)*SQ(s,n)$

It is understood that SI(i), SQ(i)=(0,1), which results in 360 binary multiplications being performed using a logical AND function, for example. Due to orthogonal nature of the DSSS chip codes, the result of SqI and SqQ above will be either a negative "1" (−1), a zero (0) or a positive "1", (1). By performing the calculations above on a DSSS chip code set (e.g., IEEE802.15.4 standard) the following results are observed:

$d=1$: $SqI(s,d,n)=0$ $d=2$: $SqQ(s,d,n)=0$ $SqI(s,d,n)=0$ for $n=1$ $d=3$: $SqI(s,d,n)=0$ $SqQ(s,d,n)=0$ for $n=1,2$ The zero results can be ignored or eliminated since no further processing is required. This is because the result of any value multiplied by zero is zero. As is illustrated above for each of the delay lags, either the real (SqQ) or the imaginary part (SqI) has a zero result. Therefore, SqI(s, n, d) and SqQ(s, n, d) can be directly calculated in advance and stored in a 3-dimensional binary look-up table or LUT (memory) 68 for SqIQ(s, n, d), where "s" is the symbol, "n" is the chip and "d" is the lag-delay.

As mentioned above the values of SqIQ(s, n, d) from the LUT 68 will be a positive or negative "1", such that the values are used to change the sign of the IQ(d, n) and QI(d, n) values from the first multiplication performed on the left-hand side of the figure $((y^*_n{}^*y_{n-d})^*(s_n{}^*s^*_{n-d}))$ on the incoming baseband signal $y_n$. The first multiplication is performed in the plurality of logic gates 96 illustrated in FIG. 4. Therefore, compared to the correlation function illustrated in FIG. 1, it is not necessary to perform the second row of "trivial" multiplications. Rather, according to embodiments of the invention, the sign (i.e., positive or negative) of the values from the first multiplication $(y^*_n{}^*y_{n-d})$ is changed according to the values stored in the LUT 68 and the values are summed together for each value of n. The sign selection is performed in section 98 of the figure, which it will be appreciated is a multiplication of the values from the first plurality of logic gates 96 by a positive or negative 1 based on the values in the LUT or memory 68. The values are summed together in a second plurality of logic gates illustrate as section 100 in the figure. It will be appreciated that the values form the first plurality of logic gates 96 will be stored in a first memory unit (not shown) before passed to the sign selection section 98. The values for all "n" and "d" are summed together to obtain a total correlation value for each chip symbol "s". It will be appreciated that the absolute value is also typically used, as illustrated in FIG. 4. The final summation and absolute value determination are performed in functional blocks 88. In the example illustrated in FIG. 4, the correlation value determination for the chip codes is performed in parallel. The memory unit or LUT 68 stores contains approximately 1440 single bits values, since the values are either a positive or negative 1 which can be stored using a 0 or 1 values.

Although not illustrated in FIG. 4, the sampled signal $I_{BB}$ and $Q_{BB}$ is stored in an input memory to allow for the first row of multiplications illustrated on the left-hand side of the figure to be performed on the sample signal in parallel. In this example, the input memory unit is the sampler 70 illustrated in FIG. 3. This is because the sampler 70 is clocking values through at the sampling frequency $f_s$ and includes 64 outputs, so that at any one time, there will 64 values (32 for each of the both $I_{BB}$ and $Q_{BB}$ signals) available. The number of samples acquired and stored in the memory unit 70 is based on the number of chips in the chip code and the sampling rate of the sampler 70 illustrated in FIG. 3. Therefore, the storage required for the sampled signal having 32 input values at a sampling rate of NoS=8, using an ADC having 4-bit values, for both $I_{BB}$ and $Q_{BB}$ is 2048 bits. It will be appreciated that the memory unit 70 outputs 32 values for each of $I_{BB}$ and $Q_{BB}$ to the first plurality of logic gates 96. It will be appreciated that the sampler 70 is constantly sampling and shifting values through such that there will be 8 samples available for each of the 32 values over a time period of 8 clock cycles at the sampling frequency.

In the first embodiment, by reducing the amount of multiplications performed by storing the inner products of the chips codes and using a sign selection based on the LUT 68 values, the amount of stored can be reduced and the number of logic gates used to the perform the multiplications can be reduced over the all-parallel example illustrated in FIG. 1.

Figure 5:
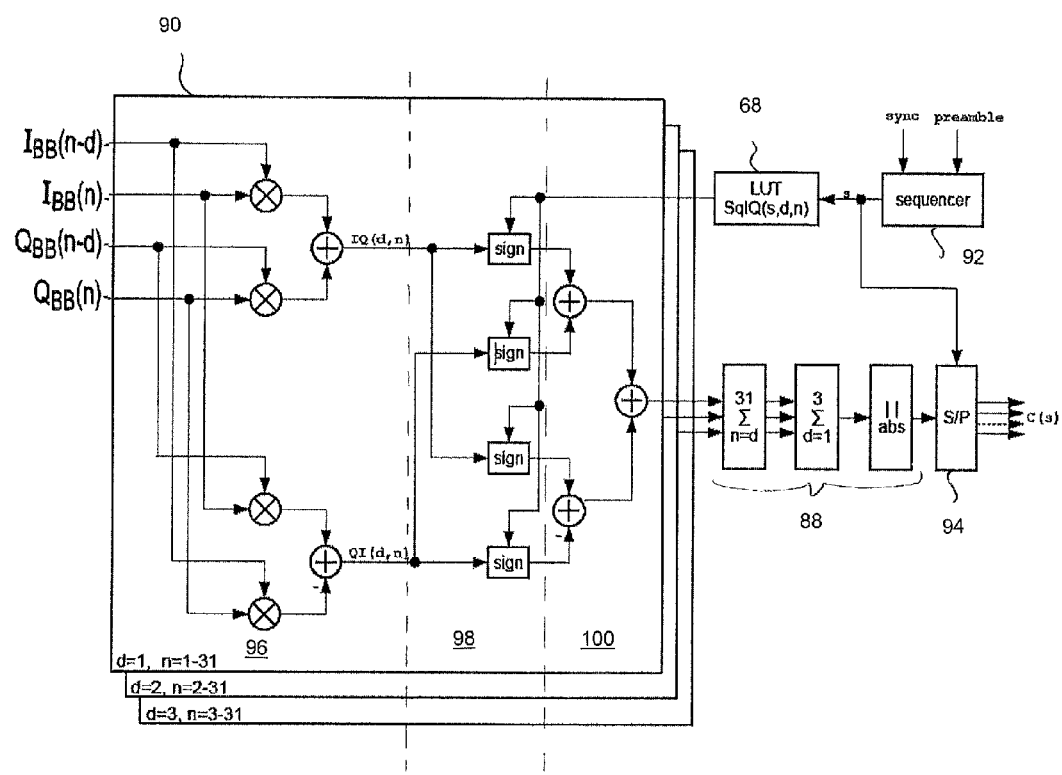
FIG. 5 illustrates a representation of the double-correlator in accordance with a second embodiment of the invention.

FIG. 5 illustrates a representation of the double-correlator 90, in accordance with a second embodiment of the invention. It will be appreciated that the double-correlator 90 may be used with the transceiver illustrated in FIGS. 2 and 3 rather that the double-correlator 72 illustrated in these figures.

If one compares the double-correlator 90 with the double-correlator 72, it can be seen that the calculation for each chip code is no longer present in the double-correlator 90 and the double-correlator 90 includes a sequencer 92 and a storage memory 94.

Figure 6:
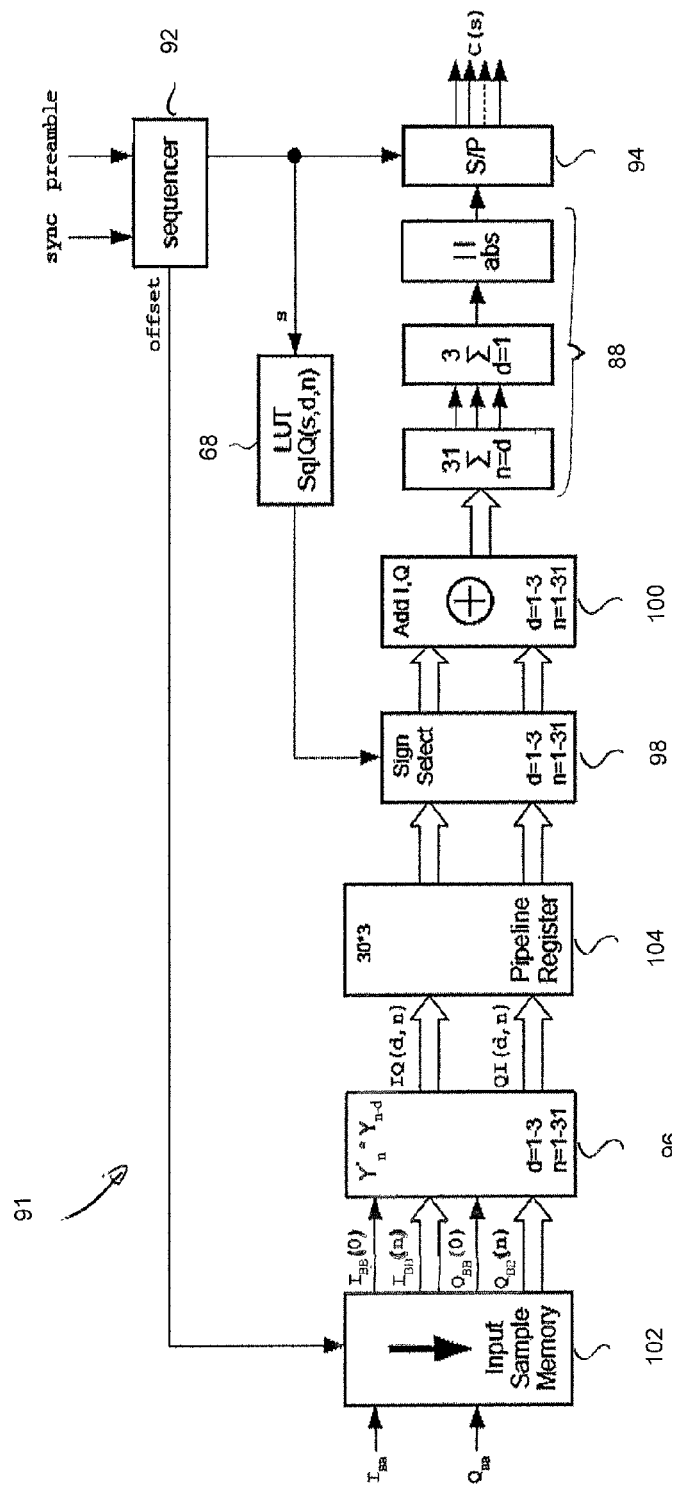
FIG. 6 illustrates schematically how the correlation illustrated in FIG. 5 is performed using a hardware representation.

FIG. 6 illustrates schematically how the correlation is performed using a hardware representation and is used in conjunction with FIG. 5 to explain how the correlation function is performed.

A memory unit or input memory unit 102 receives and stores the sampled signal for each of $I_{BB}$ and $Q_{BB}$. It will be appreciated that the memory unit 102 replaces the memory unit 70 illustrated in FIG. 3 in this embodiment. The input sample memory 102, stores the sampled signal for each of $I_{BB}$ and $Q_{BB}$, for 31 input values (each value including 8 samples, or 248 samples), which corresponds to the number of chips in the chip code less one. This is because it is not necessary to store a sample for the current signal value, since this can be simply output to the next stage. However, in some examples an additional value may be stored for the "now" sample of the signal (i.e., 249 samples may be stored).

In this example, an additional 45 samples are stored at the oversampling rate of 8 to allow for sequential symbol processing to be performed for detecting earl/now/late positions, as described in GB2472774B. Therefore, using a 4-bit ADC and a NOS of 8, a total of 2344 bits of storage are required for the memory unit 102 for the received sampled signal $I_{BB}$ and $Q_{BB}$. The memory unit 102 is illustrated as having an output for $I_{BB}$ (0) and $Q_{BB}$(0) which are the now or current values and the remainder of the values from n=1 to 31 stored therein.

The memory unit or input memory unit 102 comprises a plurality of shift registers. In this example, eight sets of shift registers arranged in series, one for each bit, are arranged in parallel. Eight bits are used, since each of the signals $I_{BB}$ and $Q_{BB}$ are sample using a 4-bit ADC. Each set of shift registers comprises 293 (294 if a now sample is stored) flip-flops in series, for example. The samples are constantly input and shifted through and the memory unit 102 includes 32 outputs or taps, each spaced apart by 8 shift registers (oversampling rate). The outputs of the memory unit 102 are fed to a plurality of logic gates arranges as a multiplier 96 in parallel.

The logic gates of the multiplier 96 are configured as would be apparent to the skilled person skilled in the art. The multiplier 96 has multiple inputs for each of the outputs of the memory unit 102 so that the values stored in the memory unit 102 are outputted in parallel to the multiplier 96. The multiplier 96 performs the multiplications on the values from the memory unit 102 in accordance with the inner product of the correlation-function, $(y^*_n{}^*y_{n-d})$, for d=1-3 and n=d to 31. The multiplier 96 performs 90 complex multiplications using 4 multipliers and 2 adders each (i.e., a total of 360 multipliers and 180 adders). The output from the multiplier 96 is in 8 bits, but may be truncated to 6 bits to reduce storage space.

The output from the multiplier 96 is fed to a pipe-line memory or register 104 for storage, which may also be referred to as a first memory unit for stored multiplication values from the multiplication performed by the multiplier or first plurality of logic gates 96. The values from the multiplier 96 are stored as 36-bit words. Each word includes the values for a value of n and all values of d for IQ(d)(n) and QI(d)(n). That is to say that each word will be of the form IQ(1)(n), QI(1)(n), IQ(2)(n), QI(2)(n), IQ(3)(n), QI(3)(n) for n=1 to 31. An example of the form of the data is illustrated below, where each bracketed term represents a 6 bit word:

<IQ(1)(1)><QI(1)(1)><IQ(2)(1)><QI(2)(1)><IQ(3)(1)><QI(3)(1)>

<IQ(1)(2)><QI(1)(2)><IQ(2)(2)><QI(2)(2)><IQ(3)(2)><QI(3)(2)>

...

<IQ(1)(31)><QI(1)(31)><IQ(2)(31)><QI(2)(31)><IQ(3)(31)><QI(3)(31)>

In the figure the pipe-line register 104 is illustrated as having 30*3 stored values. However, it will be appreciated that this is an average value of stored values, since for d=1 there will be 31 values stored, for d=2 there will be 30 values stored and for d=2 there will be 29 values stored. However, it will be further appreciated that the memory unit 104 will be symmetrical and will include storage for 31*3 values, but 3 of the storage element will not be used.

The pipe-line memory 104 is used so that the data may be re-synchronised, since a delay may result from the arithmetic operations being performed in the first plurality of logic gates 96. The pipe-line memory 102 is a parallel-in, parallel-out memory for all bits and stores a total of 31*36-bit words. The values from the first memory unit 104 are output to a sign selection unit 98.

The sign selection unit 98 is a multiplication block which multiplies each of the 93 values for each value of d and n for I and Q by the associated value stored in the LUT 68 (or second memory unit). The multiplication block 98 performs a trivial multiplication, since the values from the LUT 68 are either positive or negative 1. The sign selection unit 98 receives a selection signal s from a sequencer or controller 92. The selection signal s is outputted by the sequencer 92 to control the LUT 68 to output the values for each of the chip codes one at a time, so that the values for each chip code are calculated in series. The values for each selected chip code from the sign selection unit 98 are outputted to an adder or summation unit 100 where they are summed according to the correlation-function mentioned above. The values from the summation unit 100 are fed to a block 88 for further processing.

In block 88, the values are summed over all n for each value of d for the selected chip code. In this example, the result for each value of d is 10-bit word. The summation over all n is then summed over all values of d for the selected chip code, where it is truncated to 8 bits and the absolute value is determined. The output from block 88 is a correlation value between the selected chip code and the received signal. The correlation value is then fed to a storage unit or result memory 94. The result memory 94 also receives the selection signal s so that the memory 94 can store the result in an appropriate location for the selected chip code. In this example, the result memory 94 is a serial-to-parallel memory so that the results can be fed into the memory in serial and outputted for further processing in parallel.

In this example, the sequencer 92 also includes an offset control signal which is fed to the input sample memory 102. The offset signal may be used to offset the values outputted from the memory 102 between 0 and 45 samples, to enable the timing to be corrected for early/now/late processing. The timing for the offset may be received from the symbol/chip synchronization unit 84 for example.

As described in GB2472774B, according to the IEEE802.15.4 standard the first 8 symbols of the packet are known to be the s=0 symbol. Therefore, the sequencer 92 receives as inputs a sync signal and a preamble signal to control the sequencer dependent on whether or not the preamble is being received or the data. If the preamble is being received the control signal s need only be set to the s=0 symbol, since only this symbol is received during the preamble stage. After the preamble stage is complete, the sync is performed to adjust the timing, as described in GB2472774B.

For the second embodiment, serialisation of the symbol processing is possible since synchronisation is achieved during preamble acquisition which relies on only one symbol being received (i.e., s=0). After the symbol and chip synchronisation has been achieved, only 3 samples per chip of the chip code are used (i.e., early/now/late) for further processing per chip period, see GB2472774B.

The sequential processing of all 16 possible symbols with the received signal can be performed in 48 clock periods, whereas 256 clock periods are available per symbol period (for NoS=8).

By performing the correlation for each symbol serially, the number of non-trivial multiplications stays the same and the storage capacity is increased by 45 values for $I_{BB}$ and $Q_{BB}$ as the memory needs to maintain sample values while the symbols are processed sequentially. Furthermore, a pipe-line register of dimension (n−1)*d required after inner product ($y^*_n{}^*y_{n-d}$) computation to re-synchronise data in order to avoid timing violations. However, the number of logic gates is reduced by 16 times, since each symbol is processed sequentially.

It will be appreciated that the values are constantly clocked through the input memory 102 at the rate of the sampling frequency. Therefore, a correlation value will be calculated 8 times (once per sample period) for each chip code. However, it will be further appreciated that only one value will be stored in the storage unit or result memory 94.

Figure 7:
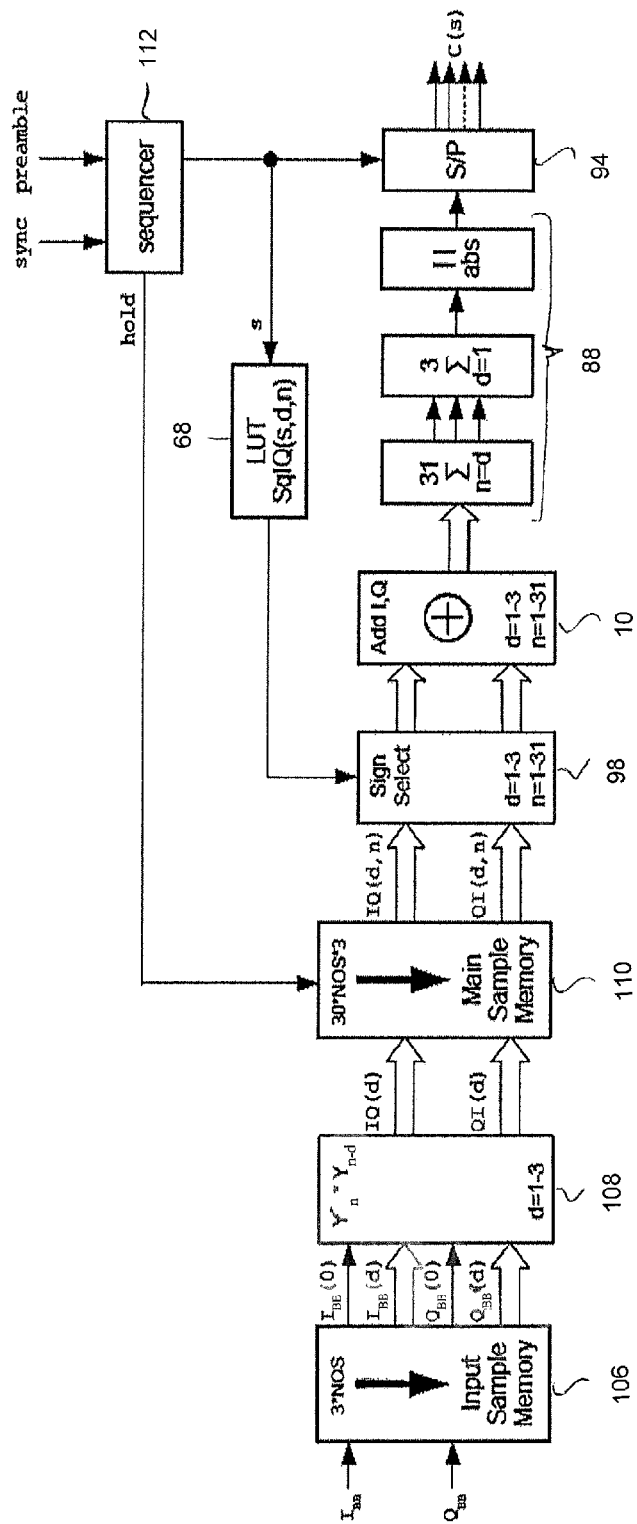
FIG. 7 illustrates schematically how the correlation is performed using a hardware representation according to a third embodiment of the invention.

FIG. 7 illustrates schematically how the correlation is performed using a hardware representation according to a third embodiment of the invention. Like features of FIG. 7 found in FIG. 6 are labelled using the same reference signs. For completeness the features of the sign selection unit 98, the adder or summation unit 100, the summation block 88, the LUT 68 and the serial-to-parallel memory unit 94 illustrated in FIG. 7 are the same as the like numbered features illustrated in FIG. 6. FIG. 7 illustrates a hardware representation of a double-correlator 91. It will be appreciated that the double-correlator 91 may be used with the transceiver illustrated in FIGS. 2 and 3 rather that the double-correlator 72 illustrated in these figures.

A memory unit or input memory unit 106 receives the $I_{BB}$ and $Q_{BB}$ signals. It will be appreciated that in this example the input memory unit 106 replaces the sampler 70 illustrated in FIG. 3. The input sample memory 106, stores the sampled signal corresponding to a single chip of the chip code (or n) for $I_{BB}$ and $Q_{BB}$, for all delay lags, d. That is to say that only three sample are stored in the memory unit 106 with 8 samples for value, for each of d=1, 2, and 3. Based on an oversampling ratio of 8 (NOS=8), a total of 24 values are stored. In embodiments of the invention, a 4-bit ADC is used so each of the 24 values will have 4-bits for each of the $I_{BB}$ and $Q_{BB}$ signals. The input memory unit 106 (storage) is an 8-bit shift register with 3 tabs or outputs every NOS (or 8) elements for output a value for each lag-delay. As illustrated in the figure $I_{BB}(0)$ and $Q_{BB}(0)$ are output and $I_{BB}(d)$ and $Q_{BB}(d)$. The values for $I_{BB}(d)$ and $Q_{BB}(d)$ are stored in the memory unit 106 and $I_{BB}(0)$ and $Q_{BB}(0)$ is the current value so may not be stored, but in some embodiments a signal value for $I_{BB}(0)$ and $Q_{BB}(0)$ is stored. The memory unit 106 comprises eight sets of serially arranged 1-bit shift registers (e.g., flip-flops), one set for each bit. Each set of flip flops comprises 24 (or 25 if $I_{BB}(0)$ and $Q_{BB}(0)$ is stored) flip-flops arranged in series. There are three tabs or outputs from the shift registers for each of d=1, 2 and 3. If the incoming, baseband, signal is sampled at NOS=8, over $I_{BB}(n)$ and $Q_{BB}(n)$, and converted using a 4-bit ADC, 192 (or 200 if $I_{BB}(0)$ and $Q_{BB}(0)$ is stored) bit total storage is used. It is noted that each of the input values $I_{BB}(n)$ and $Q_{BB}(n)$ are 4-bit values.

After the samples for d=1, 2, and 3 are stored in the input memory unit 106, the output is fed to a first plurality of logic gates arranged as a multiplier 108. It will be appreciated that the memory 106 is a shift register that is clocked at the sampling frequency so that the output values will be constantly changing at the rate of the sampling frequency. The first plurality logic gates of the multiplier 108 are configured as would be apparent to the skilled person skilled in the art. The multiplier 108 has multiple inputs for each of the outputs of the memory unit 106 so that the values stored in the memory unit 106 are outputted in parallel to the multiplier 108. The multiplier 108 performs the multiplications on the stored values from the memory unit 106 in accordance with the inner product of the correlation-function, $(y^*_n {}^* y_{n-d})$, for d=1-3 for each value of n as it is received from the memory unit 106. That is to say that inner product is performed serially, one after another, for each n. The multiplier 108 performs the complex inner product computation $(y^*_n {}^* y_{n-d})$ over d only, which may be described as a differential filter, using 3 complex multiplications. The multiplications may be performed using 4 multipliers and 2 adders each (i.e., for each value of d) or 12 multipliers and 6 adders in total. The output from the multiplier 108 is in 8-bits, but may be truncated to 6 bit for further processing.

The output from the multiplier unit 108 is fed to a main memory or first memory unit 110. The main memory unit 110 stores and shifts the inner multiplication values for IQ(d) and QI(d) received from the multiplier 108. The inner multiplication values for each IQ(d) and QI(d) for d=1, 2, 3 are stored as a 36-bit word. The memory unit 110 receives the output values from multiplier 108 for each value of n, across all d and for all 8 samples. It will be appreciated the values form the multiplier 110 are constantly changing at the rate of the sampling frequency and so will be simply input into the main memory unit 110 from the first plurality of logic gates 108 and will also be clocked or moved through the memory at the sampling rate. The memory unit 110 is a shift register so the values are loaded as 36-bit words and shifted through the memory as the values are received from the multiplier 108. The memory unit 110 comprises a plurality of shift registers. In this example, 36 sets of serially connected shift registers, one for each bit, are arranged in parallel. Each set of shift registers comprises 240 flip-flops in series, for example. The memory unit 110 stores a total of 240*36-bit words. The figure illustrates a main memory unit 110 as having 30*NOS*3 values stored therein. The values for all the products stored in the memory 104, are fed to a second plurality of logic gates or sign selection unit 98. The memory unit 110 includes an output tab every NOS (e.g., 8 in this example) samples. The output tabs provide a value for each chip of the chip code, except for n=0, since the value for n=0 is not calculated, as discussed above. In addition to the 240 storage positions, there is included an input stage, as described below, comprising 4-bits for the n=1 value. The memory unit 110, excluding the input stage, has a storage capacity of 240 36-bit words (8640 bits).

Each 36-bit word includes the values for a value of n and all values of d for IQ(d)(n, sample) and QI(d)(n, sample) for all samples. An example of the form of the data is illustrated below, where each bracketed term represents a 6-bit word:

<IQ(1)(1,1)><QI(1)(1,1)><IQ(2)(1,1)><QI(2)(1,1)><
    IQ(3)(1,1)><QI(3)(1,1)>

<IQ(1)(1,2)><QI(1)(1,2)><IQ(2)(1,2)><QI(2)(1,2)>
    <IQ(3)(1,2)><QI(3)(1,2)>

. . .

<IQ(1)(31,8)><QI(1)(31,8)><IQ(2)(31,8)><QI(2)(31,
    8)><IQ(3)(31,8)><QI(3)(31,8)>

A hold signal is fed from a sequencer 112 to the memory unit 110 to hold a number of samples within one or more of the shift registers for later early/now/late processing. The sequencer 112 operates in a similar manner to the sequencer 92 illustrated in FIG. 6, except for the sequencer 112 outputs a hold signal, rather than an offset signal.

It will be appreciated that the remaining stages of the embodiment illustrated in FIGS. 7 (98, 10, 88 and 94) are the same as those described in association with FIG. 6. It will be appreciated that the values are constantly clocked through the memory unit 110 at the rate of the sampling frequency. Therefore, a correlation value will be calculated 8 times (once per sample period) for each chip code. However, it will be further appreciated that only one value will be stored in the storage unit or result memory 94.

The sequential or serial processing of symbols is retained, but the inner product is calculated over lag delays only, and re-aligned results are stored in memory and shifted. This reduces the complex inner product multiplications from 90 to 3, such that a $30^{th}$ of the logic gates is required to achieve the inner product.

The storage capacity of the main sample memory or first memory unit 110 used is increased, but the input sample storage is reduced. The input memory generates lag delays and re-aligns inputs so that values stored in the main sample memory can be directly processed together. The main sample memory 110 is implemented as a shift register with n-2 (i.e., 30) output tabs, each tab is positioned NOS (e.g., 8) samples apart, requiring a shift-register depth of 30*NOS words. The outputs from each tab are equivalent to the inner multiplication values over n, $(y^*_n {}^* y_{n-d})$. There is also an input stage with stores the current or now value with three other values for the early/now/late processing. As before, it is not necessary to store all eights sampled for the now or current value, since it is available now.

Figure 8:
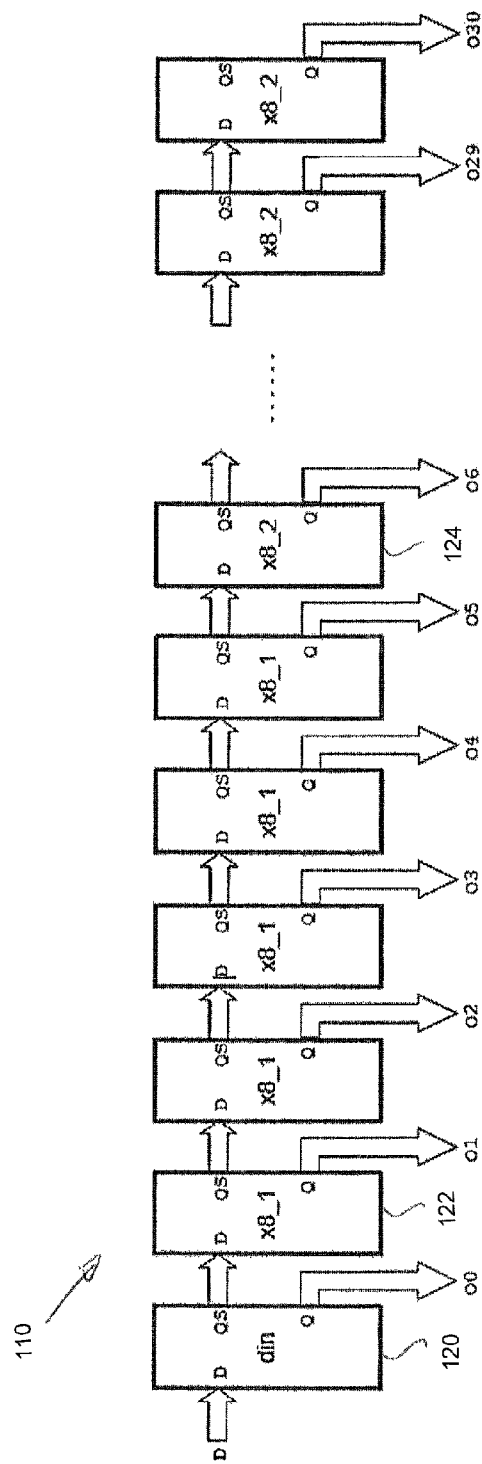
FIG. 8 illustrates schematically a memory unit illustrated in FIG. 7.

FIG. 8 illustrates schematically the shift register 110 illustrated in FIG. 7. It will be appreciated that only a 1-bit shift register is illustrated such that in practice there will be 36 shift-registers in parallel, one register for each bit of the 36-bit word. The shift register 110 includes three different types of register, an input stage or cell 120, a first cell 122 and a second cell 124. Each of the cells comprises an output, Q, and an output, QS, which is fed to the next cell. Each of the cells is clocked at the oversampling frequency or 16 MHz in this example. Each of the cells receive the hold signal from the sequencer 112. The first and second cells 122, 124 output the multiplication values for each of the values of n for all d. The memory unit includes 30 output tabs, which are spaced apart by 8 samples (NOS) and an output tab for the input stage for early/now/late processing.

Figure 9:
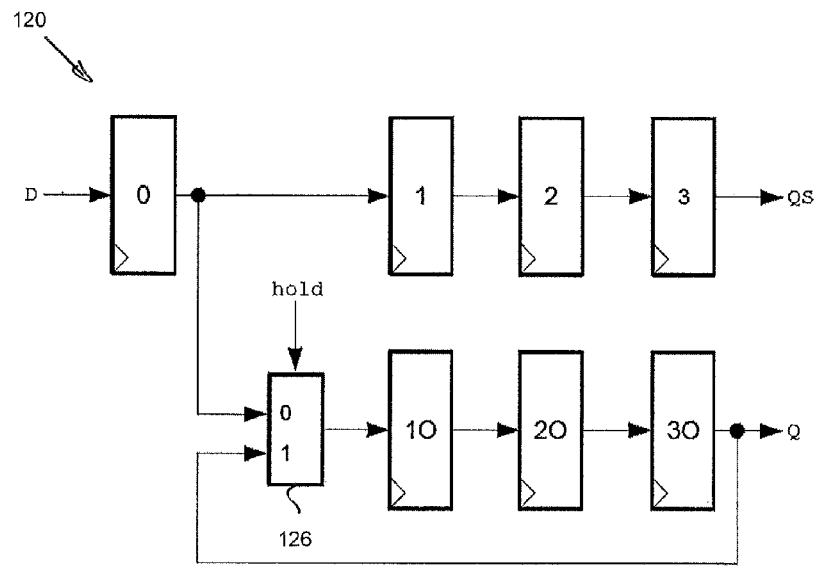
FIG. 9 illustrates schematically an input cell illustrated in FIG. 8.

FIG. 9 illustrates schematically the input cell 120 illustrated in FIG. 8. The input cell or stage 120 comprises four single shift registers in series, numbered 0, 1, 2, and 3 that shift the inputted value through from one register to the next. An additional three shift-registers labelled 1O, 2O, 3O are included for holding 3 sample values that are used for the early/now/late processing during the sequential symbol processing. The output from the 0-labelled register is fed to the first holding register 1O. A switch 126 is used to allow the inputted signal to be loaded into the holding registers when in a first position (logic zero in the figure) and to allow the bits loaded into the holding registers to be stored by looping the output of the holding registers to the input when in a second position (logic one in the figure). The holding registers are used to hold the values while the data for the next symbol is shifted into the memory.

Figure 10:
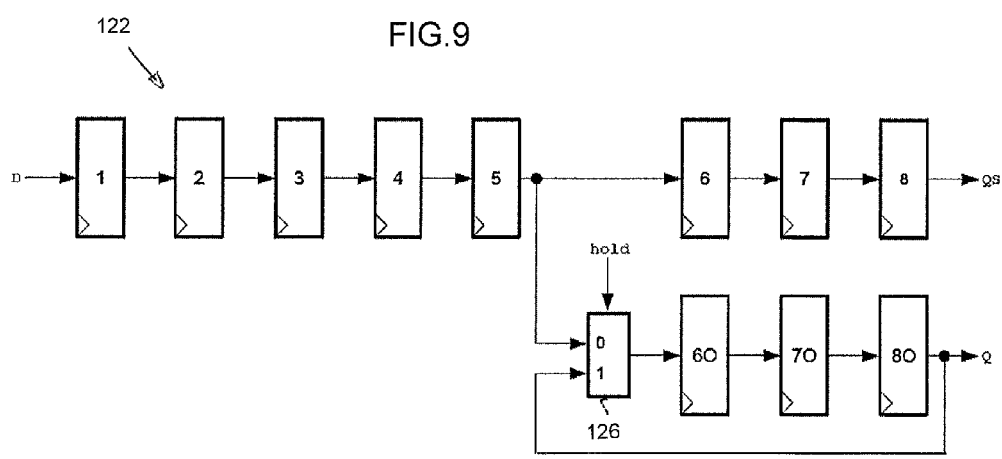
FIG. 10 illustrates schematically a first type of cell or stage illustrated in FIG. 8.

FIG. 10 illustrates schematically a first type of cell or stage 122 illustrated in FIG. 8. The first type of cell 124 comprises eight single shift registers in series (one for each sample), numbered 1, 2, 3, 4, 5, 6, 7, and 8 that shift the inputted value through from one register to the next. An additional three shift-registers labelled 6O, 7O, 8O are for holding 3 sample values that are used for the early/now/late processing during the sequential symbol processing. The output from the 5-labelled register is fed to the first holding register 6O. A switch 126 is used to load and store the 3 sample values, as described in relation to FIG. 9. The samples for the early/now/late processing are held for 45 clock cycles, since this is the amount of time that is typically required to perform this processing. This is achieved in this example using the input stage of four registers and 5 cells or stages of 8 registers each.

Figure 11:
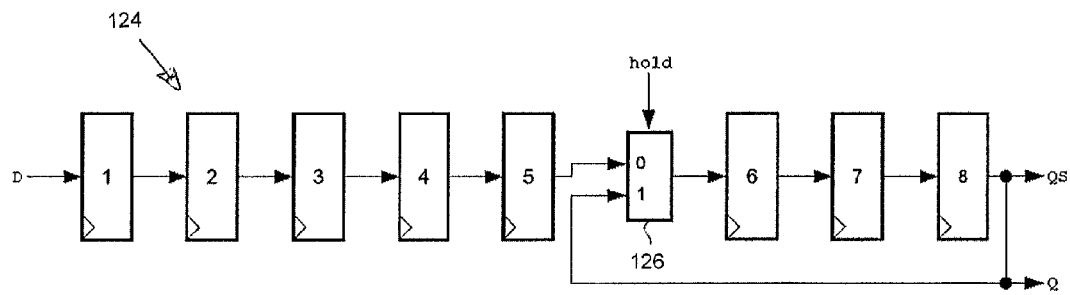
FIG. 11 illustrates schematically a second type of cell or stage illustrated in FIG. 8.

FIG. 11 illustrates schematically a second type of cell or stage 124 illustrated in FIG. 8. The input stage 122 comprises eight single shift registers in series (one for each sample), numbered 1, 2, 3, 4, 5, 6, 7, and 8 that shift the inputted value through from one register to the next. A switch 126 is arranged between the 5-labelled and 6-labelled register to control whether or not the samples should be held. It is not necessary to include additional holding-registers in the second type of cell, since no information is lost.

Therefore, for the first 45 cells or registers the 3 samples that are held are stored outside the main shift register chain in the input stage 120 and the first type of cells 122. For higher register positions in the second type of cell 124 the samples that are held can be stored in the main register chain as no information is lost.

Each of the shift-registers are implemented with dynamic flip-flops to minimise area and power consumption. No retention issues are observed, as samples have to be shifted through continuously when receiver is on, and can be otherwise discarded. The refresh rate is typically longer than the sampling rate, so no additional refresh circuitry is required.

Note that only 3 samples (early/now/late) are used per chip period so it is possible to reduce the number of stored samples (words) from 240 (i.e., NOS*30) to 90 (i.e., 3*30) words using additional timing control. However, the same circuitry is used during preamble acquisition for achieving symbol and chip synchronisation. During this period all NOS samples are required per chip, and the memory is continuously shifting and not holding samples for sequential processing as only symbol s=0 is selected.

The processing stages illustrated in FIGS. 6 and 7 are shown without any timing or control signals. However, it will appreciated that the stages illustrated in FIGS. 6 and 7 will be clocked using the 16 MHz clock frequency and control signals may be fed from the symbol/chip synchronization unit 84 or the microcontroller 32 for example. These signals may include various hold signals which may be relayed via the sequencer 92, 112 to hold values to re-align the outputs. For example the shift registers may include, for example, an output control unit that allows for a value to be outputted for processing or fed back to the input of the register to hold the value for a number of clock cycles.

Figure 12:
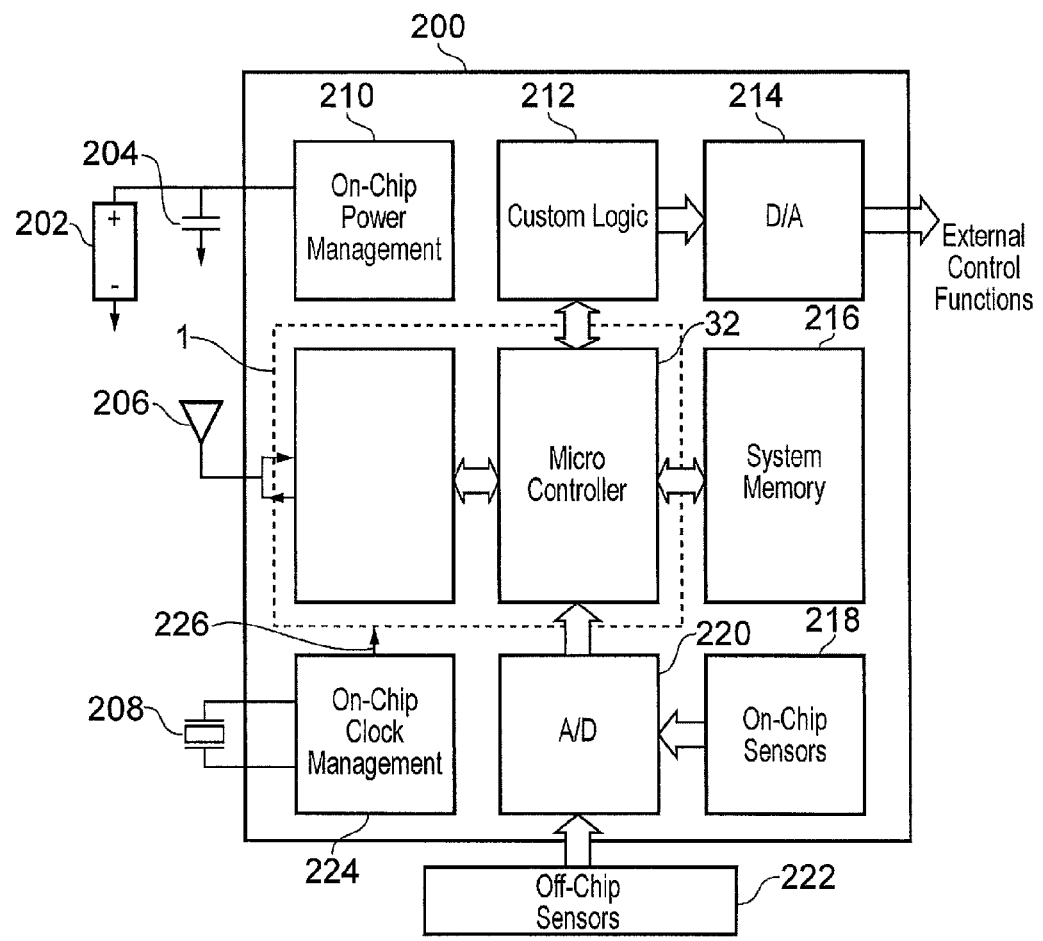
FIG. 12 shows an circuit that comprises a correlation apparatus according to the first, second or third embodiments of the invention.

FIG. 12 shows an example integrated circuit (IC) 200 that comprises at least the transceiver 1 according to the first, second or third embodiments of the invention. The transceiver 1 is shown with a dotted line to indicate that the microcontroller or microprocessor 32 is also used as a central controller for the IC 200 and is not limited to only the transceiver 1. The microcontroller or microprocessor 32 is also provided with a system memory 216.

The IC 200 is connected to the following external components; a power supply 202, a decoupling capacitor 204, an antenna 206 and a crystal oscillator 208. The power supply 202 is a battery or potable power source. However, the power supply 202 may also be a fixed or mains power supply depending on the application or location of the IC 200. FIG. 8 also shows an external sensor(s) 222. External sensors are optional and depend on the application and the type of sensor used. Examples of external sensors include, but are not limited to; optical sensors, humidity sensors, pressure sensors or acceleration sensors (i.e. accelerometers). Some of the sensors listed above may be implemented on the chip depending on the required accuracy of the application or fabrication process choice.

The IC 200 further comprises the following devices; an on-chip power management unit 210, a custom logic unit 212, a DAC 214, on-chip sensors 218, an ADC 220 and an on-chip clock management unit 224.

The on-chip clock management unit 224 provides the clock or timing signals to each of the components of the IC 200 at the frequency of 16 MHz, which coincides with the sampling frequency described above. Other than the blocks described above within the demodulator 26, the IC 200 operates at the same frequency of 16 MHz. The on-chip clock management unit 224 provides both the transceiver timing signals and the sampling timing signals to the transceiver 1, via connection 226. The on-chip clock management unit 224 is fed by a crystal 208.

The on-chip power management unit 210 provides the power to all the components of the IC 200. The precise connections are not shown in the figure for simplicity. The on-chip power management unit 210 may also be used to determine whether or not the chip is in a sleep mode (not transmitting or receiving) or an active mode (transmitting or receiving). Alternatively, the on-chip power management unit 210 may be controlled to put the IC 200 into a sleep or active mode.

The DAC 214 is used to control external functions (not shown), for example electromechanical, light or heating depending on the received signals. The DAC 214 is fed by a custom logic unit 212, which is used to produce the necessary control signals required by the external control functions. The custom logic unit is fed by the microprocessor 32.

The on-chip sensors 218 are sensors that can be fabricated on the same chip as the other components. Examples of on-chip sensors include optical sensors (silicon photo-diodes), temperature sensors or electromagnetic sensors. The ADC 220 is fed by the on-chip sensors 218 and the off-chip sensors 222. The digital output from the ADC 220 is then fed to the microcontroller 32 for control of the external functions or for transmission to another transceiver located elsewhere.

The embodiments have been described as being performed using a number of logic gates and memory units in the form of shift registers. In accordance with embodiment of the invention this may be implemented in a purpose built ASIC or may be implemented using a programmable array. Furthermore, the method may be performed using a general purpose computer having stored thereon instructions to perform the steps described above. Embodiments of the invention may also include a memory device or storage device having stored thereon instructions which when run on an appropriate processor perform the steps described above.

In summary, by using the techniques described herein, it is possible to reduce the overall size and therefore cost of the receiver/transceiver. To illustrate the space saving a comparison table is shown below. The table includes a measure used for comparison of an equivalent number of gates, which is a relative measure of area estimated for a given process technology.

| Implementation | Parallel (first embodiment) | Sequential Symbol Processing (second embodiment) | Sample Storage for Inner Product (third embodiment) |
| --- | --- | --- | --- |
| Input Storage | 5200 | 6200 | 400 |
| Inner Product Multiplications | 51000 | 51000 | 2100 |
| Inner Product Storage | 2800 | 2800 | 22800 |
| Remaining Processing* | 248400 | 18000 | 18000 |
| Total | 307400 | 78000 | 43300 |

*Includes circuitry for sign selection, addition of real (I) and imaginary (Q) components for each value for d and n, summation over all d and n and computation of absolute value, sequencing and LUT implementation.

It will be appreciated that each of the embodiments build upon the previous embodiment, but it will be appreciated that the improvement described for each embodiment may be implemented separately.

The correlation technique described above for embodiments of the invention are for the IEEE 802.15.4 standard. However, it will be appreciated that the same demodulation technique may be applied to the following:

high-end cordless phones operating in industrial, scientific and medical (ISM) bands (2.4 GHz and 5.8 GHz);
remote control R/C links (i.e. for models);
802.11b WiFi. 1st generation WiFi.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e. meaning "might") rather than the mandatory sense (i.e., meaning "must"). Similarly, the words "include", "including", and "includes" mean including, but not limited to.

The invention claimed is:

1. An apparatus for performing a double correlation function on a received signal and a plurality of predetermined chip codes from a communication standard, the apparatus comprising:
a first plurality of logic gates configured as a multiplier unit operable to receive a signal sampled at a predetermined sampling frequency, and to perform predetermined multiplication operations on the input signal in accordance with the correlation function;
a first memory unit operable to receive and store multiplication values from the first plurality of logic gates;
a second memory unit having stored therein values from predetermined multiplication operations performed on the plurality of chip codes in accordance with the correlation function; and
a second plurality of logic gates configured as an adder unit to receive multiplication values outputted from the first memory unit and the second memory unit and to sum the multiplication values from the first memory unit taking into account the multiplication values from the second memory unit; and
a sign selection unit configured to assign a positive or negative sign to each value from the first plurality of logic gates dependent on the sign of an associated value stored in the second memory unit.

2. The apparatus according to claim 1, comprising a third plurality of logic gates configured as a result-adder unit operable to receive and sum values received from the second plurality of logic gates.

3. The apparatus according to claim 2, comprising a sequencer operable to select multiplication values associated with one of the chip codes stored in the second memory unit to be outputted to the second plurality of logic gates, whereby the second plurality of logic gates is operable to sum the multiplication values from the first memory unit taking into account the multiplication values for the selected chip code.

4. The apparatus according to claim 3, comprising a correlation value memory unit operable to receive and store the sum of the values from the third plurality of logic gates for the selected chip code, wherein the correlation value memory unit is configured to receive a selection signal from the sequencer to select a position in the correlation value memory unit to store the sum of the values from the third plurality of logic gates.

5. The apparatus according to claim 1, comprising an input sample memory configured to store therein the received sampled signal and to output sampled signal values to the first plurality of logic gates.

6. The apparatus according to claim 5, wherein the first plurality of logic gates is configured to perform a predetermined number of product calculations in parallel based on the number of chips in the chip code and wherein the input sample memory is configured to output a predetermined number of samples to the first plurality of logic gates based on the correlation function and the number of chips in the chip code.

7. The apparatus according to claim 5, wherein the first plurality of logic gates is configured to perform a predetermined product calculation and output the result to the first memory unit, wherein the input sample memory is configured to output samples to the first plurality of logic gates based on the correlation function.

8. The apparatus according to claim 7, wherein the first memory unit comprises a plurality of cells arranged in series, wherein each cell comprises an output for outputting a multiplication value, whereby the multiplication values from the plurality of cells are stored in series from the first plurality of logic gates and output in parallel.

9. The apparatus according to claim 8, wherein the number of cells and cell outputs is based on the number of chips in the chip code.

10. The apparatus according to claim 8, wherein each of the cells comprises a plurality of shift registers arranged in series.

11. The apparatus according to claim 8, comprising a third plurality of logic gates configured as a result-adder unit operable to receive and sum values received from the second plurality of logic gates wherein one of the cells is arranged to hold a value for a predetermined period of time dependent on a hold signal received from the sequencer while values are fed through the one cell.

12. The apparatus according to claim 8, wherein the second plurality of logic gates is operable to sum the multiplication values from the first memory unit when a predetermined number of multiplication values based on the number of chip codes are stored therein.

13. A receiver comprising:
    an analog signal input for receiving an analog signal;
    an analog-to-digital converter arranged to convert the received analog signal into a digital signal; and
    a demodulator connected to the output of the an analog-to-digital converter; the demodulator comprising a sampler operable to sample the digital signal at a predetermined sampling frequency; and an apparatus according to any one of claims 1-4, or 5-12 arranged to receive the sampled signal.

14. A method for performing a double correlation function on a received signal and a plurality of predetermined chip codes from a communication standard, the method comprising the steps of:
    receiving a signal sampled at a predetermined sampling frequency;
    performing predetermined multiplication operations on the input signal in accordance with the correlation function;
    storing multiplication values from the predetermined multiplication operations performed on the input signal in a first memory unit;
    configuring a second memory unit having stored therein values from predetermined multiplication operations performed on the plurality of chip codes in accordance with the correlation function; and
    summing the multiplication values from the first memory unit taking into account the multiplication values stored in the second memory unit; and
    assigning a positive or negative sign to each value from the first plurality of logic gates dependent on the sign of an associated value stored in the second memory unit.

* * * * *